US011858791B2

(12) United States Patent
Messina et al.

(10) Patent No.: US 11,858,791 B2
(45) Date of Patent: Jan. 2, 2024

(54) LOAD MAP INTERFACE SYSTEM AND METHODS

(71) Applicant: Oshkosh Corporation, Oshkosh, WI (US)

(72) Inventors: Robert S. Messina, Oshkosh, WI (US); Catherine Lee, Oshkosh, WI (US); Louis A. Bafile, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 203 days.

(21) Appl. No.: 17/546,437

(22) Filed: Dec. 9, 2021

(65) Prior Publication Data

US 2022/0185643 A1 Jun. 16, 2022

Related U.S. Application Data

(60) Provisional application No. 63/124,047, filed on Dec. 10, 2020.

(51) Int. Cl.
*B66F 17/00* (2006.01)
*H04W 4/029* (2018.01)
(Continued)

(52) U.S. Cl.
CPC .......... *B66F 17/006* (2013.01); *B66F 9/0759* (2013.01); *B66F 9/24* (2013.01); *H04W 4/021* (2013.01); *H04W 4/029* (2018.02)

(58) Field of Classification Search
CPC ........ B66F 17/006; B66F 9/0759; B66F 9/24; B66F 17/00; B66F 9/075; B66F 11/00;
(Continued)

(56) References Cited

U.S. PATENT DOCUMENTS 9,045,014 B1 6/2015 Verhoff et al.
9,174,686 B1 11/2015 Messina et al.
(Continued)

FOREIGN PATENT DOCUMENTS

JP 2019-002242 A 1/2019
JP 2019-167745 A 10/2019

OTHER PUBLICATIONS

Nishizawa et al.: Working Machine (CN 110462139 A) (Year: 2019).*
(Continued)

*Primary Examiner* — Meless N Zewdu
(74) *Attorney, Agent, or Firm* — Foley & Lardner LLP (57) ABSTRACT

Systems and apparatuses include a load map interface system including one or more processing circuits comprising one or more memory devices coupled to one or more processors, the one or more memory devices configured to store instructions thereon that, when executed by the one or more processors, cause the one or more processors to: receive a load map from an external input; determine a work machine load based at least in part on a sensor array of a work machine; generate a modified load map based on the received load map and the work machine load, the modified load map including an acceptable zone defining an acceptable load threshold and a warning zone defining a warning zone threshold; determine a location of the work machine on the modified load map; and send a notification to a display indicating that the work machine is within the acceptable zone or the warning zone.

20 Claims, 4 Drawing Sheets

(51) Int. Cl.
*B66F 9/075* (2006.01)
*B66F 9/24* (2006.01)
*H04W 4/021* (2018.01)

(58) Field of Classification Search
CPC .. B66F 11/04; B66F 2700/00; B66F 2700/03; B66F 2700/02; B66F 3/25; B66F 3/32; B66F 7/28; B66F 9/0755; B66F 9/07554; B66F 9/07559; B66F 9/07563; B66F 9/07586; B66F 9/127; B66F 11/044; B66F 17/06; B66F 19/00; B66F 3/24; H04W 4/021; H04W 4/029; H04W 4/38; H04W 4/40; H04W 4/26; H04W 4/27; H04W 4/02; H04W 4/025; H04W 4/023; E02F 9/261; E02F 9/264; E02F 9/26; G05B 19/0405; G05B 19/045; G05B 19/00; G05B 19/18; G05B 19/048; G05B 19/054; G05B 19/058
See application file for complete search history.

(56) References Cited

U.S. PATENT DOCUMENTS

| | | | |
|---|---|---|---|
| 9,656,640 B1 | 5/2017 | Verhoff et al. | |
| 9,707,869 B1 | 7/2017 | Messina et al. | |
| 9,955,318 B1* | 4/2018 | Scheper et al. | H04W 4/043 |
| 10,434,995 B2 | 10/2019 | Verhoff et al. | |
| 11,001,135 B2 | 5/2021 | Yakes et al. | |
| 11,007,863 B2 | 5/2021 | Yakes et al. | |
| 11,110,977 B2 | 9/2021 | Smith et al. | |
| 11,136,187 B1 | 10/2021 | Koga et al. | |
| 11,148,880 B1 | 10/2021 | Koga et al. | |
| 11,161,415 B1 | 11/2021 | Koga et al. | |
| 11,254,498 B1 | 2/2022 | Koga et al. | |
| 11,260,835 B2 | 3/2022 | Verhoff et al. | |
| 11,273,804 B2 | 3/2022 | Verhoff et al. | |
| 11,273,805 B2 | 3/2022 | Verhoff et al. | |
| 2013/0109375 A1* | 5/2013 | Zeiler et al. | 455/426.1 |
| 2018/0215354 A1 | 8/2018 | Linsmeier et al. | |
| 2018/0284788 A1* | 10/2018 | Remboski et al. | G05D 1/0214 |
| 2019/0340876 A1* | 11/2019 | Northrup et al. | G07F 17/3244 |
| 2021/0079625 A1* | 3/2021 | Narkawa et al. | E02F 9/26 |
| 2021/0157312 A1* | 5/2021 | Cella et al. | G05B 23/0294 |

OTHER PUBLICATIONS

3D Space Monitoring Device, 3D Space Monitoring Method, and 3D Space Monitoring Program; JP 6403920 B1. (Year: 2018).*

Wang David Jingqiu: Automation Interface; WO 2015172035 A2. (Year: 2015).*

International Search Report and Written Opinion regarding International Application No. PCT/US2021/062617, dated Apr. 19, 2022, 14 pps.

* cited by examiner

LOAD MAP INTERFACE SYSTEM AND METHODS

CROSS-REFERENCE TO RELATED APPLICATION

This application claims priority to and the benefit of U.S. Provisional Patent Application No. 63/124,047, filed Dec. 10, 2020, the entire contents of which are incorporated herein by reference.

BACKGROUND

Working machines such as lifts and telehandlers sometimes need to operate in limited spaces (e.g., working on a bridge) where weight is a factor for consideration. Operators of working machines within such limited spaces typically use their judgement to define weight bearing operating zones.

SUMMARY

One exemplary embodiment relates to a load map interface system that includes one or more processing circuits comprising one or more memory devices coupled to one or more processors, the one or more memory devices configured to store instructions thereon that, when executed by the one or more processors, cause the one or more processors to: receive a load map from an external input; determine a work machine load based at least in part on a sensor array of a work machine; generate a modified load map based on the received load map and the work machine load, the modified load map including an acceptable zone defining an acceptable load threshold and a warning zone defining a warning zone threshold; determine a location of the work machine on the modified load map; and send a notification to a display indicating that the work machine is within the acceptable zone or the warning zone.

Another exemplary embodiment relates to a work machine that includes a chassis, a prime mover coupled to the chassis, an implement coupled to the chassis and driven by the prime mover, a sensor array structured to provide load information indicative of a work machine load, and a user interface including a display and one or more processing circuits. The processing circuits include one or more memory devices coupled to one or more processors, the one or more memory devices configured to store instructions thereon that, when executed by the one or more processors, cause the one or more processors to: receive a load map from an external input; determine the work machine load based at least in part on information received from the sensor array; generate a modified load map based on the received load map and the work machine load, the modified load map including an acceptable zone defining an acceptable load threshold and a warning zone defining a warning zone threshold; determine a location of the work machine on the modified load map; and send a notification to the display indicating that the work machine is within the acceptable zone or the warning zone.

Another exemplary embodiment relates to a method that includes receiving a load map, determining a work machine load based at least in part on information received from a sensor array of a work machine, generate a modified load map based on the received load map and the work machine load, the modified load map including an acceptable zone defining an acceptable load threshold and a warning zone defining a warning zone threshold, determine a location of the work machine on the modified load map, and send a notification to a display indicating that the work machine is within the acceptable zone or the warning zone.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for generating a load map based on a load of a work machine and a condition of a work site. In some embodiments, the condition of the work site can include structural strength of work zones (e.g., a bridge), ground condition (e.g., a low or muddy area), and/or existing loads (e.g., other machines or material piles). The load map can be communicated to a machine operator via a user interface. In some embodiments, the user interface includes a real time map, showing a current machine location, a distance to a warning zone, and other information. In some embodiments, the user interface includes a color coded warning indicator, a speaker that produces an audible alarm, or another indicator structured to communicate to the machine operator that the work machine is approaching or is located within a warning zone or an alarm zone. In some embodiment, a warning zone includes areas of the load map where the load of the work machine is within a predefined warning range for a defined warning area, and an alarm zone includes areas of the load map where the load of the work machine is within a predefined alarm range for a defined alarm area.

Figure 1:
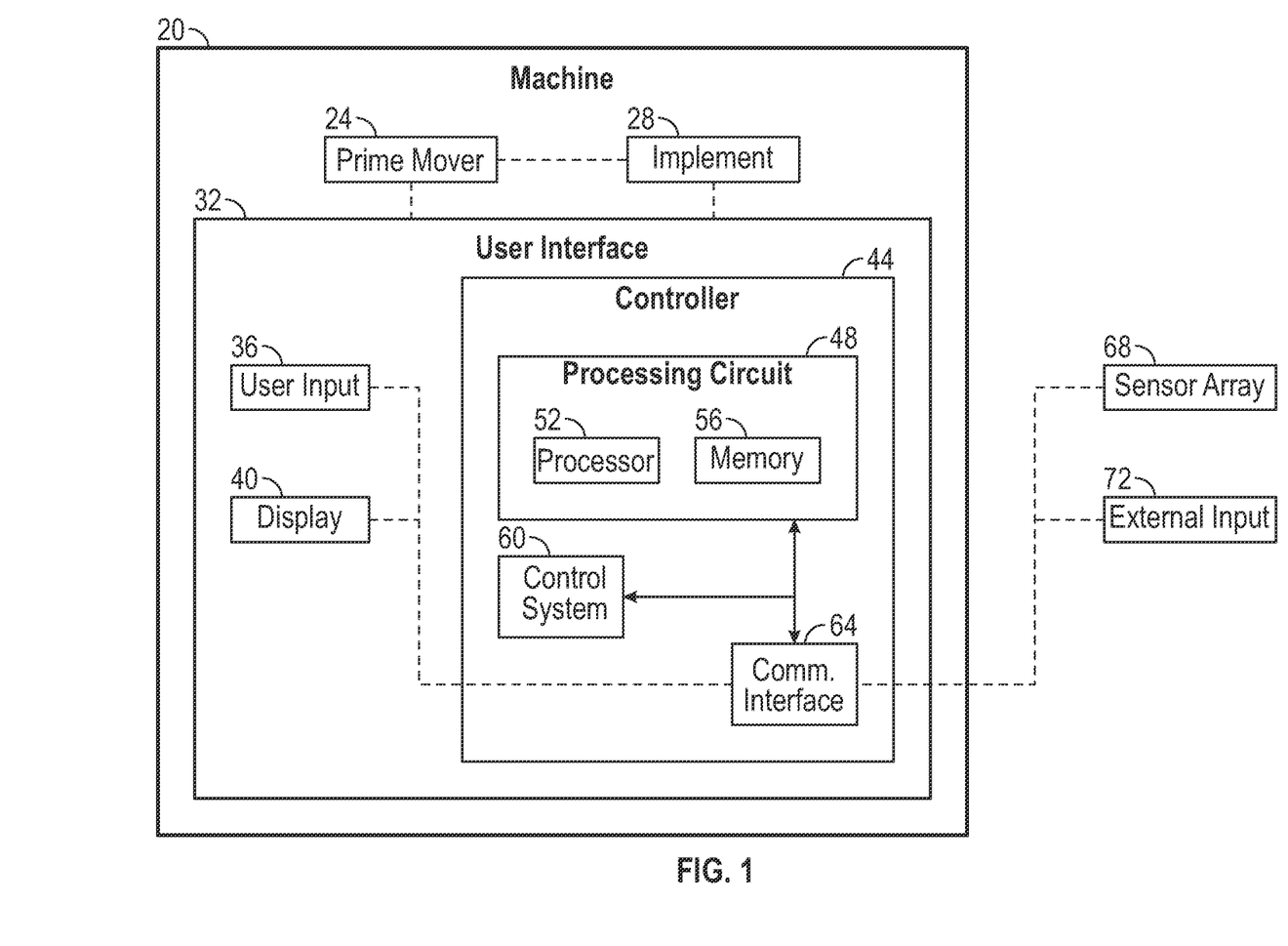
FIG. 1 is a schematic representation of a machine including a load map interface system according to some embodiments.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a controller 44.

As the components of FIG. 1 are shown to be embodied in the work machine 20, the controller 44 may be structured as one or more electronic control units (ECU). The controller 44 may be separate from or included with at least one of an implement control unit, an exhaust aftertreatment control unit, a powertrain control module, an engine control module, etc. In some embodiments, the controller 44 includes a processing circuit 48 having a processor 52 and a memory device 56, a control system 60, and a communications interface 64. Generally, the controller 44 is structured to receive inputs from a sensor array 68 and external inputs 72 (e.g., a load map, a machine-to-machine communication, a fleet management system, a network, etc.) via the communications interface 64, and the control system 60 generates a modified load map of a construction zone. The modified load map includes acceptable zones where a working machine load is acceptable, warning zones where the work machine load is above a predefined warning threshold, and alarm zones where the work machine load is above a predefined alarm threshold. In some embodiments, the predefined alarm threshold defines a greater load than the predefined warning threshold. The working machine load can include the sum of machine weight and additional loads, dynamic loads (e.g., moving loads, moments, etc.), ground area pressure (e.g., a total load divided by ground contact area of a tracked vehicle or a wheeled vehicle), or other loading factors. The control system 60 can output location information, modified load map information, and spatial information relative to the working machine position within the modified load map to the display 40. For example, the display may indicate whether the working machine is currently located within an acceptable zone, a warning zone, or an alarm zone, a distance to a nearby zone, or other information indicative of the working machine load relative to the work environment.

The sensor array 68 can include physical and virtual sensors for determining load, and location devices. In some embodiments, the sensor array includes a global positioning system (GPS) device that provide global positioning system coordinates, a lidar location device, inertial navigation, or other sensors structured to determine a position of the work machine 20 relative to maps.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the controller 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

Figure 2:
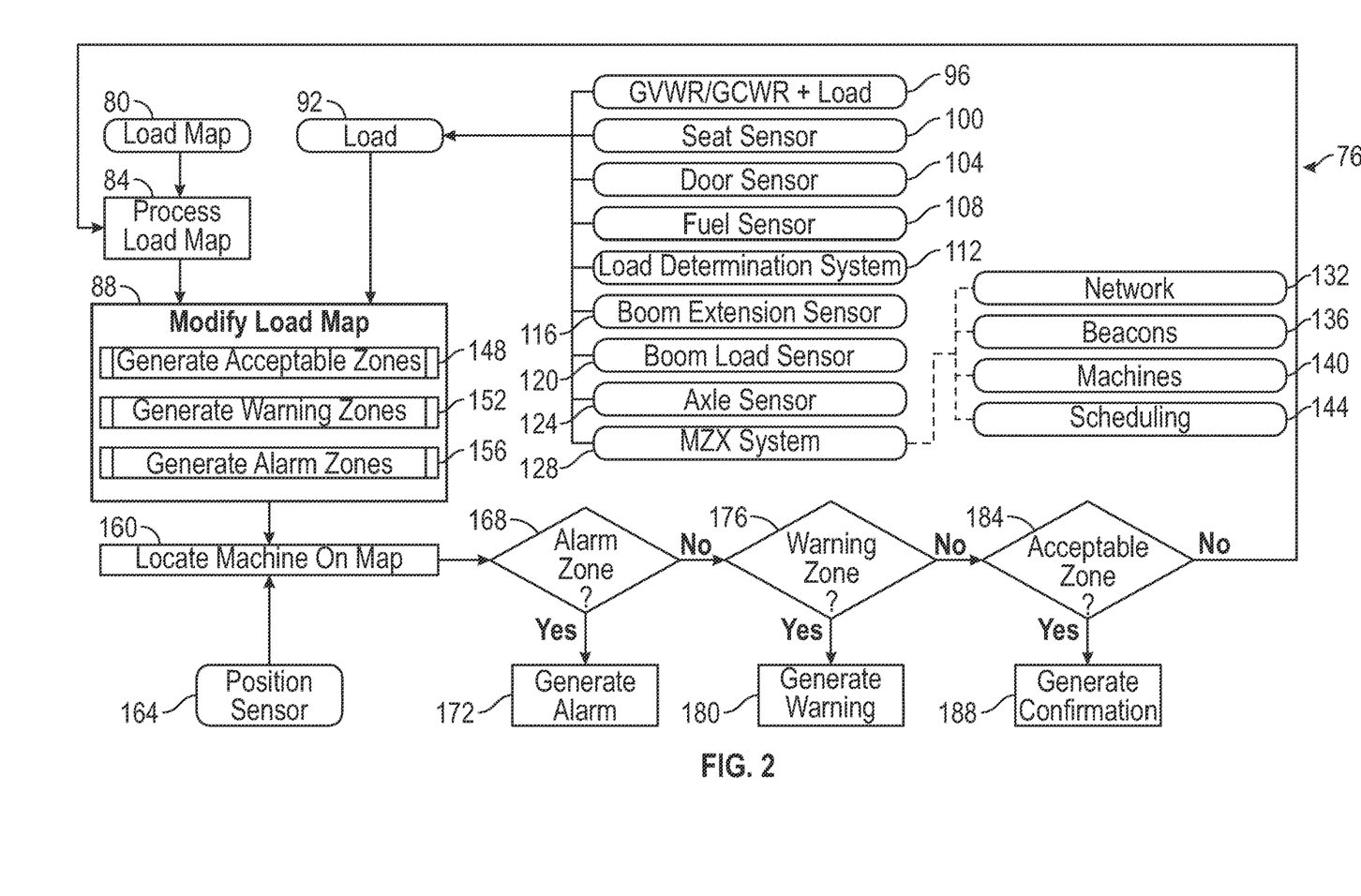
FIG. 2 is a flow diagram of a method of operation of the load map interface system of FIG. 1, according to some embodiments.

As shown in FIG. 2, the controller 44 is structured to implement a method 76 of determining a modified load map, locating the working machine 20 on the modified load map, and indicating a location status (e.g., acceptable, warning, alarm) to the operator. At step 80, a load map is received (e.g., from an external input 72 such as a work site coordinator). In some embodiments, the load map is provided by structural engineers of a project or work site. For example, a bridge construction site with support beams and a temporary deck in place. The load map may include environmental information including ground or soil composition (e.g., concrete, dirt, sand, loam, swamp matts, gravel, traffic bond, etc.), weather information (e.g., it has rained for three days previously and soil composition will be muddy, etc.), or other factors that affect the work site's ability to support loads.

At step 84, the controller 44 processes the received load map into a usable format. In some embodiments, the processed load map may be segregated into discrete load blocks each defining a maximum load, an alarm threshold, a warning threshold, and an acceptable threshold. In some embodiments, the modified load map is structured as a topographical type map, a heat map, or another representation of load thresholds.

At step 88, the controller 44 modifies the load map received in step 80 in view of load information 92. In some embodiments, the load information 92 is generated using some or all of the following inputs. Gross vehicle weight ratings, gross combined weight ratings, known payloads, machine operating weight, etc. 96. These values may be known from the manufacturer and specific payloads. A seat sensor 100 determines a weight on the seat, or the weight of the operator. A door sensor 104 can be used in coordination with the seat sensor 100 to determine occupancy of a cab, bucket, or operator area. A fuel sensor 108 can indicate how full a full tank is and the associated weight or dynamic loading of a fuel tank. A load determination system 112 structured to determine an active load of the work machine 20. In some embodiments, the load determination system 112 includes physical and virtual sensors (e.g., stress sensors, etc.) that are capable of determining a current weight or load of the work machine 20. A boom extension sensor 116 can indicate a percentage or length of extension of a boom and therefore affect dynamic loading determinations. A boom load sensor 120 coordinated with the boom extension sensor 116 to aid in the determination of dynamic loads extended on a boom (i.e., the implement 28). An axle sensor 124 can indicate a loading on a specific axle and can aid in determining ground pressure information, 9or load distribution of the work machine 20.

A machine-to-X (M2X) system 128 can integrate the work machine 20 with a network 132, load beacons 136, other work machines 140, and/or a scheduling or other fleet coordination system 144. The M2X system allows for the coordination of multiple machines within the same work site, or a fleet wide control. For example, if a first work machine 20 is in a location or zone of the modified load map, a second working machine 20 may be inhibited from entering the zone. In some embodiments, the beacons 136 of the M2X system 128 can be attached to machines not associated with the fleet to identify their contributing loads, or other non-dynamic loads (e.g., a weight or load can be associated with a material pile such as an I-beam pile, gravel pile, etc.). The M2X system 128 allows for work schedule coordination, fleet coordination, and other factors that impact the ability of the work site to support loads within spatial zones.

Using the load information 92, the modified load map generated at step 88 is used to generate acceptable zones 148, warning zones 152, and alarm zones 156. The acceptable zones 148 define load an acceptable load threshold. The warning zones 152 define a warning load threshold that is greater than the acceptable load threshold. The alarm zones 156 define an alarm threshold that is greater than the warning threshold. In some embodiments, the acceptable zones 148, the warning zones 152, and the alarm zones 156 are defined relative to the load 92. The modified load map includes location maps or information for each of the acceptable zones 148, the warning zones 152, and the alarm zones 156. In some embodiments, the acceptable zones 148, the warning zones 152, and the alarm zones 156 each include GPS or locational boundaries.

At step 160, the method 76 locates the machine 20 on the modified load map using a position or location sensor information 164 (e.g., the senor array 68). At step 168, the method 76 determines if the location information is within an alarm zone. If the work machine 20 is located within an alarm zone, then an alarm is generated at step 172 that is relayed to the operator via the display 40. At step 176, the method 76 determines if the location information is within a warning zone. If the work machine 20 is located within a warning zone, then a warning is generated at step 180 that is relayed to the operator via the display 40. At step 184, the method 76 determines if the location information is within an acceptable zone. If the work machine 20 is located within an acceptable zone, then a confirmation is generated at step 188 that is relayed to the operator via the display 40.

Figure 3:
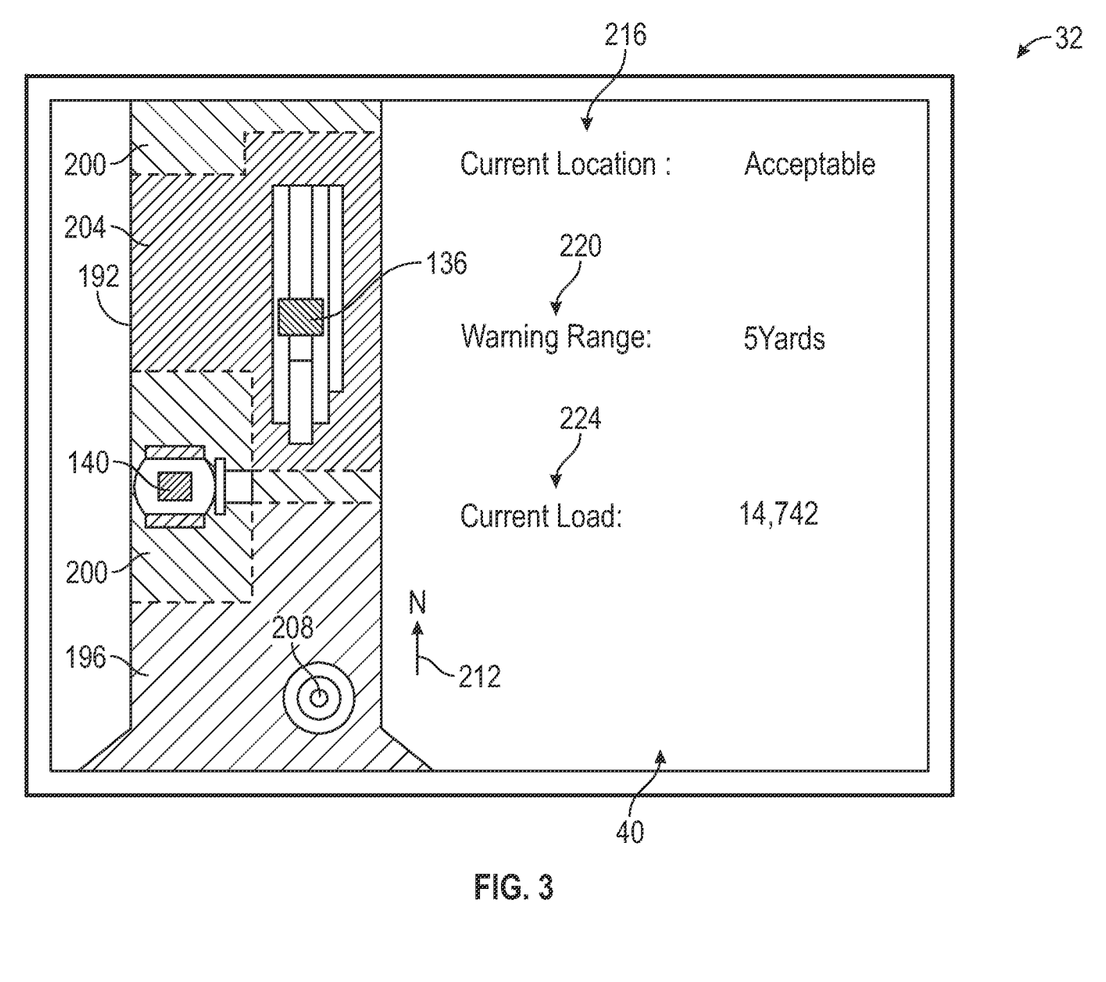
FIG. 3 is a graphical user interface of the load map interface system of FIG. 1, according to some embodiments.

As shown in FIG. 3, the display 40 of the user interface 32 can display the modified load map in the form of a visual map of a work site 192 (e.g., a bridge) that includes acceptable zones 196 (shown in green), warning zones 200 (shown in blue), and alarm zones 204 shown in red. The modified load map can also include visual representations of M2X system 128 information (e.g., the beacon 136, and the machine 140). As discussed above, the presence of other loads in the worksite can affect the load zones on the modified load map. A current location 208 can be visually represented on the map as well as a directional identifier 212 to aid the operator to identify the current location on the map and relative to the real-world surroundings they see. The display 40 can also include a current location status 216 (e.g., the current location is within an acceptable zone), a distance to a warning zone or an alarm zone 220, and/or a current load 224 (e.g., including the load 92). Other information may also be displayed by the user interface 32 as desired. In some embodiments, the user interface 32 includes a simple indicator such as a red/yellow/green light or lamp, a dial, a gauge, a sliding scale, etc. In some embodiments, the display 40 and user interface 32 includes an audible alarm, or an integration into an automation system. For example, in some embodiments, a reduction in speed may be implemented when the work machine 20 enters a warning zone, and inhibits forward motion further into an alarm zone once an alarm zone has been entered.

Figure 4:
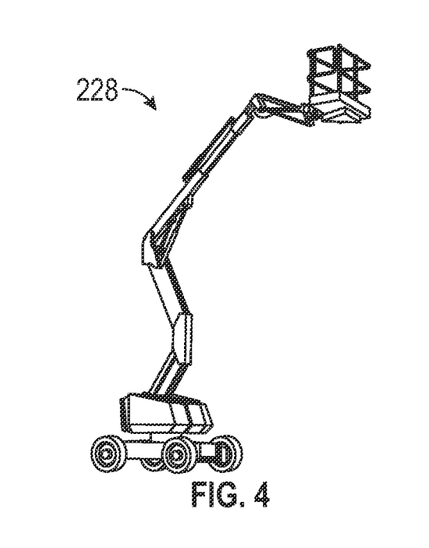
FIG. 4 is an articulating boom lift incorporating the load map interface system of FIG. 1, according to some embodiments.
Figure 5:
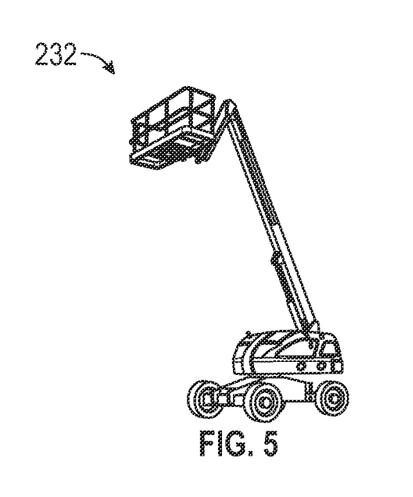
FIG. 5 is a telescoping boom lift incorporating the load map interface system of FIG. 1, according to some embodiments.
Figure 6:
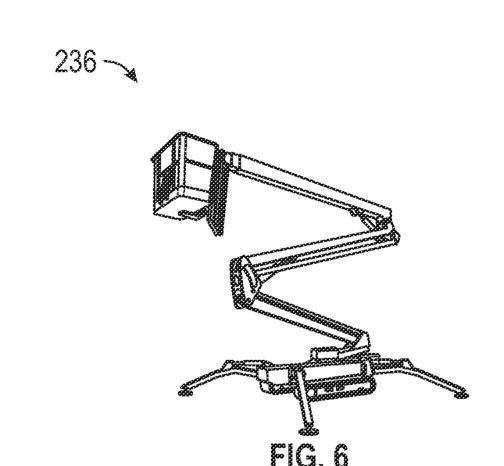
FIG. 6 is a compact crawler boom lift incorporating the load map interface system of FIG. 1, according to some embodiments.
Figure 7:
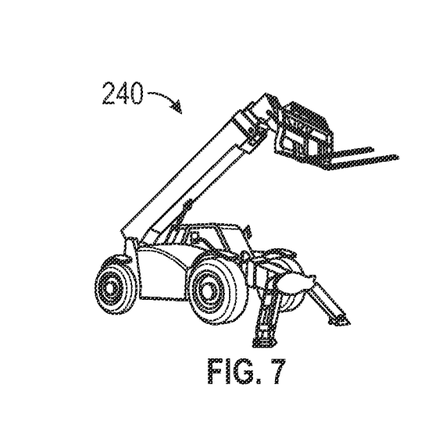
FIG. 7 is a telehandler incorporating the load map interface system of FIG. 1, according to some embodiments.
Figure 8:
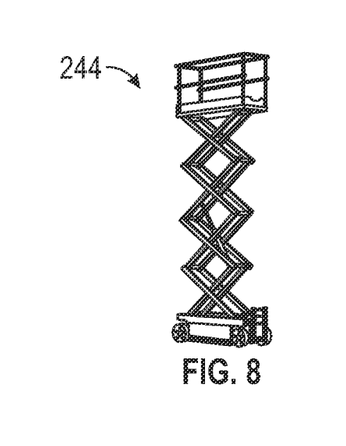
FIG. 8 is a scissor lift incorporating the load map interface system of FIG. 1, according to some embodiments.
Figure 9:
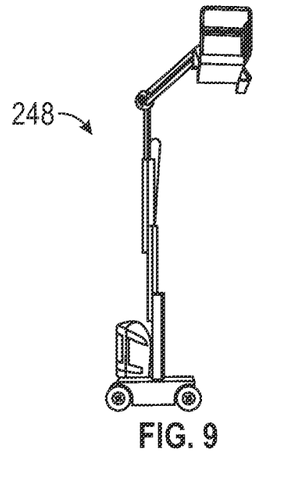
FIG. 9 is a toucan mast boom lift incorporating the load map interface system of FIG. 1, according to some embodiments.

As shown in FIGS. 4-9, the load map interface system (e.g., the user interface 32 including the controller 44) and methods (e.g., the method 76) described above may be implemented using various work machines 20 such as an articulating boom lift as shown in FIG. 4, a telescoping boom lift as shown in FIG. 5, a compact crawler boom lift as shown in FIG. 6, a telehandler as shown in FIG. 7, a scissor lift as shown in FIG. 8, and/or a toucan mast boom lift as shown in FIG. 9.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A load map interface system, comprising:
one or more processing circuits comprising one or more memory devices coupled to one or more processors, the one or more memory devices configured to store instructions thereon that, when executed by the one or more processors, cause the one or more processors to:
receive a load map from an external input;
determine a work machine load based at least in part on input received from a sensor array of a work machine;

generate a modified load map based on the received load map and the work machine load, the modified load map including an acceptable zone defining an acceptable load threshold and a warning zone defining a warning zone threshold;

determine a location of the work machine on the modified load map; and send a notification to a display indicating that the work machine is within the acceptable zone or the warning zone.

2. The apparatus of claim 1, wherein the acceptable zone and the warning zone each define locational boundaries.

3. The apparatus of claim 1, wherein the location of the work machine include global positioning system coordinates.

4. The apparatus of claim 1, wherein the work machine load is based on at least one of a machine weight, a load weight, a seat sensor, a door sensor, a fuel sensor, a load determination system, a boom extension sensor, a boom load sensor, an axle sensor, or a machine-to-X system.

5. The apparatus of claim 1, wherein the modified load map is generated using beacons that store load information.

6. The apparatus of claim 1, wherein the work machine load includes ground pressure information.

7. The apparatus of claim 1, wherein the modified load map further includes an alarm zone defining an alarm load threshold.

8. The apparatus of claim 1, wherein the notification includes a graphical representation of the modified load map and the work machine location.

9. The apparatus of claim 8, wherein the graphical representation includes a first color coded representation of the acceptable zone and a second color coded representation of the warning zone.

10. The apparatus of claim 8, wherein the graphical representation is updated in real time as any of the modified load map, the location of the work machine, or the work machine load changes.

11. The apparatus of claim 1, wherein the one or more memory devices are further configured to store instructions thereon that, when executed by the one or more processors, cause the one or more processors to:

determine a distance from the location of the work machine to the warning zone; and send the notification to the display including the distance from the location of the work machine to the warning zone.

12. The apparatus of claim 1, wherein the one or more memory devices are further configured to store instructions thereon that, when executed by the one or more processors, cause the one or more processors to:

compare the work machine load to the acceptable load threshold and the warning zone threshold; and generate the modified load map based on the comparison.

13. The apparatus of claim 1, wherein the one or more memory devices are further configured to store instructions thereon that, when executed by the one or more processors, cause the one or more processors to:

send the notification to a speaker to produce an audible alarm when the work machine is within a threshold distance of the warning zone.

14. A work machine, comprising:

a chassis;

a prime mover coupled to the chassis;

an implement coupled to the chassis and driven by the prime mover;

a sensor array structured to provide load information indicative of a work machine load; and a user interface including a display and one or more processing circuits comprising one or more memory devices coupled to one or more processors, the one or more memory devices configured to store instructions thereon that, when executed by the one or more processors, cause the one or more processors to:

receive a load map from an external input;

determine the work machine load based at least in part on information received from the sensor array;

generate a modified load map based on the received load map and the work machine load, the modified load map including an acceptable zone defining an acceptable load threshold and a warning zone defining a warning zone threshold;

determine a location of the work machine on the modified load map; and send a notification to the display indicating that the work machine is within the acceptable zone or the warning zone.

15. The work machine of claim 14, wherein the sensor array includes at least one of a machine weight sensor, a ground pressure sensor, a load weight sensor, a seat sensor, a door sensor, a fuel sensor, a load determination system, a boom extension sensor, a boom load sensor, an axle sensor, or a machine-to-X system.

16. The work machine of claim 14, wherein the modified load map is generated using beacons that store load information.

17. The work machine of claim 14, wherein the modified load map further includes an alarm zone defining an alarm load threshold, wherein the alarm load threshold is greater than the warning zone threshold.

18. The work machine of claim 14, wherein the notification includes a graphical representation of the modified load map and the work machine location.

19. The work machine of claim 14, wherein the one or more memory devices are further configured to store instructions thereon that, when executed by the one or more processors, cause the one or more processors to:

determine a distance from the location of the work machine to the warning zone; and send the notification to the display including the distance from the location of the work machine to the warning zone.

20. A method, comprising:

receiving a load map;

determining a work machine load based at least in part on information received from a sensor array of a work machine;

generate a modified load map based on the received load map and the work machine load, the modified load map including an acceptable zone defining an acceptable load threshold and a warning zone defining a warning zone threshold;

determine a location of the work machine on the modified load map; and send a notification to a display indicating that the work machine is within the acceptable zone or the warning zone.

* * * * *